United States Patent
Ahmad

(10) Patent No.: US 7,634,499 B2
(45) Date of Patent: Dec. 15, 2009

(54) METHOD, SYSTEM AND COMPUTER-READABLE MEDIA FOR REPAIRING DATA RECORD CORRUPTION

(75) Inventor: Aziz Ahmad, San Jose, CA (US)

(73) Assignee: Objectivity, Inc., Sunnyvale, CA (US)

( * ) Notice: Subject to any disclaimer, the term of this patent is extended or adjusted under 35 U.S.C. 154(b) by 145 days.

(21) Appl. No.: 11/650,699

(22) Filed: Jan. 6, 2007

(65) Prior Publication Data

US 2008/0168088 A1    Jul. 10, 2008

(51) Int. Cl.
*G06F 17/00* (2006.01)
(52) U.S. Cl. .............................. 707/103 R; 707/103 Y
(58) Field of Classification Search ...................... None
See application file for complete search history.

(56) References Cited

U.S. PATENT DOCUMENTS

| | | | |
|---|---|---|---|
| 5,550,976 A | 8/1996 | Henderson |
| 5,568,639 A | 10/1996 | Wilcox |
| 5,664,189 A | 9/1997 | Wilcox |
| 5,832,069 A | 11/1998 | Waters |
| 6,181,336 B1 | 1/2001 | Chiu |
| 6,240,545 B1 | 5/2001 | Carmichael |
| 6,321,358 B1 | 11/2001 | Anderson |
| 6,611,898 B1 | 8/2003 | Slattery |
| 6,654,029 B1 | 11/2003 | Chiu |
| 6,807,538 B1 | 10/2004 | Weinberger |
| 7,047,425 B2 | 5/2006 | Dubuque |
| 2001/0034822 A1 | 10/2001 | Weinreb et al. |
| 2001/0051948 A1 | 12/2001 | Srinivasan et al. |
| 2002/0099688 A1 | 7/2002 | Attaluri et al. |
| 2002/0161781 A1 | 10/2002 | Leong |
| 2002/0165865 A1 | 11/2002 | Hosokai |
| 2003/0023617 A1 | 1/2003 | Hunt |
| 2003/0033277 A1 | 2/2003 | Bahulkar |
| 2003/0061194 A1 | 3/2003 | Lee |
| 2003/0167456 A1 | 9/2003 | Sabharwal |
| 2003/0204514 A1 | 10/2003 | Owens |
| 2004/0039747 A1 | 2/2004 | Katano |
| 2004/0236703 A1 | 11/2004 | Lemaire et al. |
| 2004/0244009 A1 | 12/2004 | Bak et al. |
| 2005/0091223 A1 | 4/2005 | Shaw et al. |

(Continued)

OTHER PUBLICATIONS

Liu et al, "The design and implementation of a self-healing database system", Journal of Intelligent Information Systems, vol. 23, No. 3, Nov. 2004, pp. 247-269.*

(Continued)

*Primary Examiner*—Uyen T. Le
(74) *Attorney, Agent, or Firm*—Patrick Reilly

(57) ABSTRACT

A system and method for repairing software database corruption are provided. The corruption may be due to an object being associated with an invalid type number. The information of an object with invalid type can become effectively or actually beyond retrieval and the data may be lost. The invention uses a computer to gather attributes of the corrupted object, e.g., object size. The computer then looks in the schema "type number" repository for type numbers associated with the same attributes as they are for the instant object. The object may then be organized presented by the computer to a user using a schema associated with a matched type number. Then the user may select a type number to replace the corrupted or invalid type number of the instant object.

12 Claims, 10 Drawing Sheets

U.S. PATENT DOCUMENTS

| | | |
|---|---|---|
| 2005/0102314 A1* | 5/2005 | Howard et al. .............. 707/102 |
| 2005/0120080 A1 | 6/2005 | Weinreb et al. |
| 2005/0160164 A1* | 7/2005 | Benfield et al. ............. 709/223 |
| 2005/0165807 A1 | 7/2005 | Srinivasan et al. |
| 2005/0187955 A1 | 8/2005 | Bahulkar |
| 2006/0101055 A1 | 5/2006 | Valdiserri |
| 2006/0190478 A1 | 8/2006 | Owens |
| 2008/0005182 A1* | 1/2008 | Gauthier et al. ............. 707/200 |

OTHER PUBLICATIONS

Poncelet et al, "Consistent Structural Updates for Object Database Design", Lecture notes in Computer Sciences, vol. 685, Springer, pp. 1-21.*

* cited by examiner

- TYPE NUMBER : 9997
- ACCOUNT : 83837
- NAME.FIRST : JOHN
- NAME.LAST : SKINNY
- HEIGHT : 72.25
- WEIGHT : 160.5

58

METHOD, SYSTEM AND COMPUTER-READABLE MEDIA FOR REPAIRING DATA RECORD CORRUPTION

FIELD OF THE INVENTION

The present invention relates to information technology systems that maintain databases and enable searches for information contained within the database. The present invention more particularly relates to improving means to reduce loss of information contained in an information technology system due to corruption or errors in data or data processing.

BACKGROUND OF THE INVENTION

Data stored in a software database may associated in data structures such as software objects, wherein information related to the data may be implicitly provided in the design of the data structure containing the data. A particular data structure design may be identified by a structural indicator, e.g., a type number, within the context of a database, and the data populating a particular instance of a data structure may be stored as a record. The record may include a unique record identifying that is useful in distinguishing the instant record from the other records maintained, or accessible, to a database manager software to which the record is accessible. The record may further include a structural indicator that uniquely identifies the data structure design, e.g., software object, that may be populated by the data of the record to accurately convey information concerning this data. When a type number of a record is corrupted or otherwise incorrect, prior art database manager software typically identifies the instant record as being corrupted and provide limited or no access to the data contained within the record. The data of the record may thereby be effectively lost within the context of the software database.

A software database is a collection of information stored in an information technology system in a systematic way, such that a user may employ a computer to retrieve information from the database. A software program used to manage and query a software database is known as a database management system (hereafter "DBMS").

In the conventional art, most databases are organized as either a relational database or as an object-oriented database. A relational database (hereafter "RDBS") stores data in a structure consisting of one or more tables of rows and columns, which are typically interconnected. Each RDBS row corresponds to a record, i.e., a tuple, and each RDBS column correspond to an attribute, i.e., a field, in a record. A Structured Query Language (hereafter "SQL") is used for data definition, data management, and data access and retrieval from a RDBS.

An object oriented database (hereafter "OODBS") is based on the object oriented software data model. Instantiating and using an OODBS requires aspects of traditional DBMS, semantic data modeling and object oriented programming languages.

Many public and private enterprises maintain federated databases enabled by information technology infrastructures that support numerous databases. In a federated database system, a client query application can generate a single query to retrieve data matching the query that is distributed across multiple database management systems and then provide the retrieved data to a user as if the retrieved were locally stored. For example, a federated database might include combination of (1.) an object oriented database as marketed by Objectivity, Inc., of Sunnyvale, Calif.; (2.) an IBM DB2 Universal Database™ server (in Linux, UNIX®) marketed by IBM Corporation of Armonk, N.Y.; (3.) WINDOWS™ operating system environments marketed by Microsoft Corporation of Redmond, Wash.; and (4.) multiple data sources to which the client query application sends queries.

Prior art work in the area of object-oriented database management includes U.S. Pat. No. 7,047,425 discloses a scaleable multi-level security method in object oriented open network systems; U.S. Pat. No. 6,807,538 discloses a passenger entertainment system, method and article of manufacture employing object oriented system software; U.S. Pat. No. 6,654,029 discloses a data-base independent, scalable, object-oriented architecture and API for managing digital multimedia assets; U.S. Pat. No. 6,611,898 discloses an object-oriented cache management system and method; U.S. Pat. No. 6,321,358 discloses an object reconstruction on object oriented data storage device; U.S. Pat. No. 6,240,545 discloses a setting instance breakpoints in object oriented computer programs; U.S. Pat. No. 6,181,336 discloses a data-base-independent, scalable, object-oriented architecture and API for managing digital multimedia assets; U.S. Pat. No. 5,832,069 discloses an object oriented system for modeling telecommunications circuits to estimate the access cost for leasing selected circuits; U.S. Pat. No. 5,664,189 discloses a method and apparatus for providing object-oriented file structuring system on a computer; U.S. Pat. No. 5,568,639 discloses a method and apparatus for providing an object-oriented file structuring system on a computer; and U.S. Pat. No. 5,550,976 discloses a decentralized distributed asynchronous object oriented system and method for electronic data management, storage, and communication.

More recent prior art work in this area includes US Patent Application Serial No. 20060190478 discloses a method and apparatus for object oriented storage and retrieval of data from a relational database; US Patent Application Serial No. 20060101055 discloses an interactive 3-dimensional object-oriented database information storage/retrieval system; US Patent Application Serial No. 20050187955 discloses a method and apparatus for object-oriented access to a relational database management system (RDBMS) based on any arbitrary predicate; US Patent Application Serial No. 20050165807 discloses a method and system for representing and accessing object-oriented data in a relational database system; US Patent Application Serial No. 20050120080 discloses a method and apparatus for virtual memory mapping and transaction management in an object-oriented database system; US Patent Application Serial No. 20050091223 discloses a method and apparatus for building and maintaining an object-oriented geospatial database; US Patent Application Serial No. 20040244009 discloses an online database for receiver types in object-oriented systems; US Patent Application Serial No. 20040236703 discloses a transaction-based object-oriented multipart database apparatus and method; US Patent Application Serial No. 20040039747 discloses a retrieval device and retrieval method for object-oriented database; US Patent Application Serial No. 20030204514 discloses a method and apparatus for object oriented storage and retrieval of data from a relational database; US Patent Application Serial No. 20030167456 discloses an architecture for building scalable object oriented web database applications; US Patent Application Serial No. 20030061194 discloses an accessing relational database using an object-oriented language; US Patent Application Serial No. 20030033277 discloses a method and apparatus for object-oriented access to a relational database management system (RDBMS) based on any arbitrary predicate; US Patent Application Serial No.

20030023617 discloses an object oriented database interface encapsulation that allows for chronologically overlapping transactions in a multi-threaded environment; US Patent Application Serial No. 20020165865 discloses a data operating device for providing schema with freedom in data operation of object-oriented database; US Patent Application Serial No. 20020161781 discloses a method, system, program, and computer readable medium for indexing object oriented objects in an object oriented database; US Patent Application Serial No. 20020099688 discloses a method and system for handling foreign key update in an object-oriented database environment; US Patent Application Serial No. 20010051948 discloses a method and system for representing and accessing object-oriented data in a relational database system; and US Patent Application Serial No. 20010034822 discloses a method and apparatus for virtual memory mapping and transaction management in an object-oriented database system.

The entire disclosures of each and every patent and patent application mentioned in this present disclosure, to include US Patent Application Serial No.'s 20060190478; 20060101055; 20050187955; 20050165807; 20050120080; 20050091223; 20040244009; 20040236703; 20040039747; 20030204514; 20030167456; 20030061194; 20030033277; 20030023617; 20020165865; 20020161781; 20020099688; 20010051948; and 20010034822; and U.S. Pat. Nos. 7,047,425; 6,807,538; 6,654,029; 6,611,898; 6,321,358; 6,240,545; 6,181,336; 5,832,069; 5,664,189; 5,568,639; and 5,550,976, as noted above, are incorporated herein by reference, in their entirety, and for all purposes.

Loss of access to the data stored in a record of a software database can more than negate the value of maintaining the database. Yet the prior art has failed to offer means and techniques to optimally provide information to a database administrator to help the administrator to assign a structural indication to a data structure when the structural indicator, e.g., an object type number, associated with the instant data structure is corrupted or is possibly corrupted.

SUMMARY OF THE INVENTION

Towards this object and other objects that will be made obvious in light of this disclosure, a first version of the method of the present invention provides a method for a computer to gather attributes of the corrupted software object, e.g., object size, data types, and counts of information values. The computer then looks in the schema type number repository for type numbers that are associated with schema organized with the same attributes found in or presented by the corrupted object. The corrupted object may then be organized and presented by the computer to a user using a schema associated with an alternate type number. Then the user may select a type number to replace the corrupted or invalid type number of the corrupted object.

Certain alternate preferred embodiments of the method of the present invention provide a system and method for processing a detection of an invalid data record structural indicator of a record of a software database stored in, or accessible by, an information technology system, wherein the method comprises (a.) determining that an assigned schema identified by a structural indicator associated with a software record may not be validly applied to the software record; (b.) comparing the aspects, qualities, and/or attributes of the software record with a plurality of alternate record schema, wherein each alternate record schema is assigned a unique structural indicator; and (c.) determining which of the alternate record schema may be validly applied to the software object.

A schema is a conceptual model applicable to, or defining, the structure of an element, e.g., a record, of database that defines the data contents and relationships between or among data. It is understood that the term schema is defined herein to include an information model implemented by means of or within a database. A schema may define, for example, aspects of data, types of data, e.g., integers, real numbers, alphanumeric characters, and relationships among data.

Certain alternate preferred embodiments of the method of the present invention provide a method for processing a detection of an invalid type number of a software object of an object oriented software database, wherein the method comprises (a.) determining that an assigned schema identified by a type number associated with a software object may not be validly applied to the software object; (b.) comparing the attributes of the software object with a plurality of alternate object schema, wherein each alternate object schema is assigned a unique type number; and (c.) determining which of the alternate object schema may be validly applied to the software object.

Certain still alternate preferred embodiments of the method of the present invention provide that (a.) a type number of at least one schema that may be validly applied to the software object is provided to a user; (b.) all of the type numbers of each schema that may be validly applied to the software object are provided to a user; (c.) the user may assign a provided type number to the software object; and/or (d.) the alternate object schema may be analyzed to determine a degree of compatibility of each of the schema with the software object; (e.) two or more alternate object schema may be ordered in order of degree of compatibility with the software object.

Certain yet alternate preferred embodiments of the method of the present invention provide that (a.) each type number of the schema that are determined to be most compatible with the software object may be provided to a user; (b.) the type numbers provided to the user are each associated with an indication of relative degree of compatibility with the software object.

A first preferred embodiment of the present invention provides a computational system that is communicatively coupled with an information technology network, wherein the information technology network includes a software database, and the computational system includes (a.) means for determining that a schema associated with a record of the database is invalid; (b.) means for determining alternate schema that may be validly applied to the record; and/or (c.) means for communicating a type number of at least one alternate schema that may be applied to the record to a user. Each record is associated with a type number, and each type number is associated with a schema of a software object or other suitable data structure known in the art, whereby an instantiation of a record is performed according to a schema identified by a type number associated with the instant record.

Various additional preferred embodiments of the present invention provides a computational system further comprising (a.) a means of enabling a user to associate a type number provided with the record; (b.) a means of enabling a user to assign a type number to the record as stored in the database; (c.) means of enabling a user to apply a schema of a type number to an instantiation of the record; (d.) means of enabling a user to apply each schema of two or more type numbers provided in an instantiation of the record, whereby the user evaluates separate alternate instantiations of the record with each applied schema; and/or (d.) records that are software objects.

Other alternate preferred embodiments of the present invention include a computer-readable media storing machine-readable instructions that direct a computational system to execute one or more the actions or processes in accordance with a practice of the method of the present invention.

The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
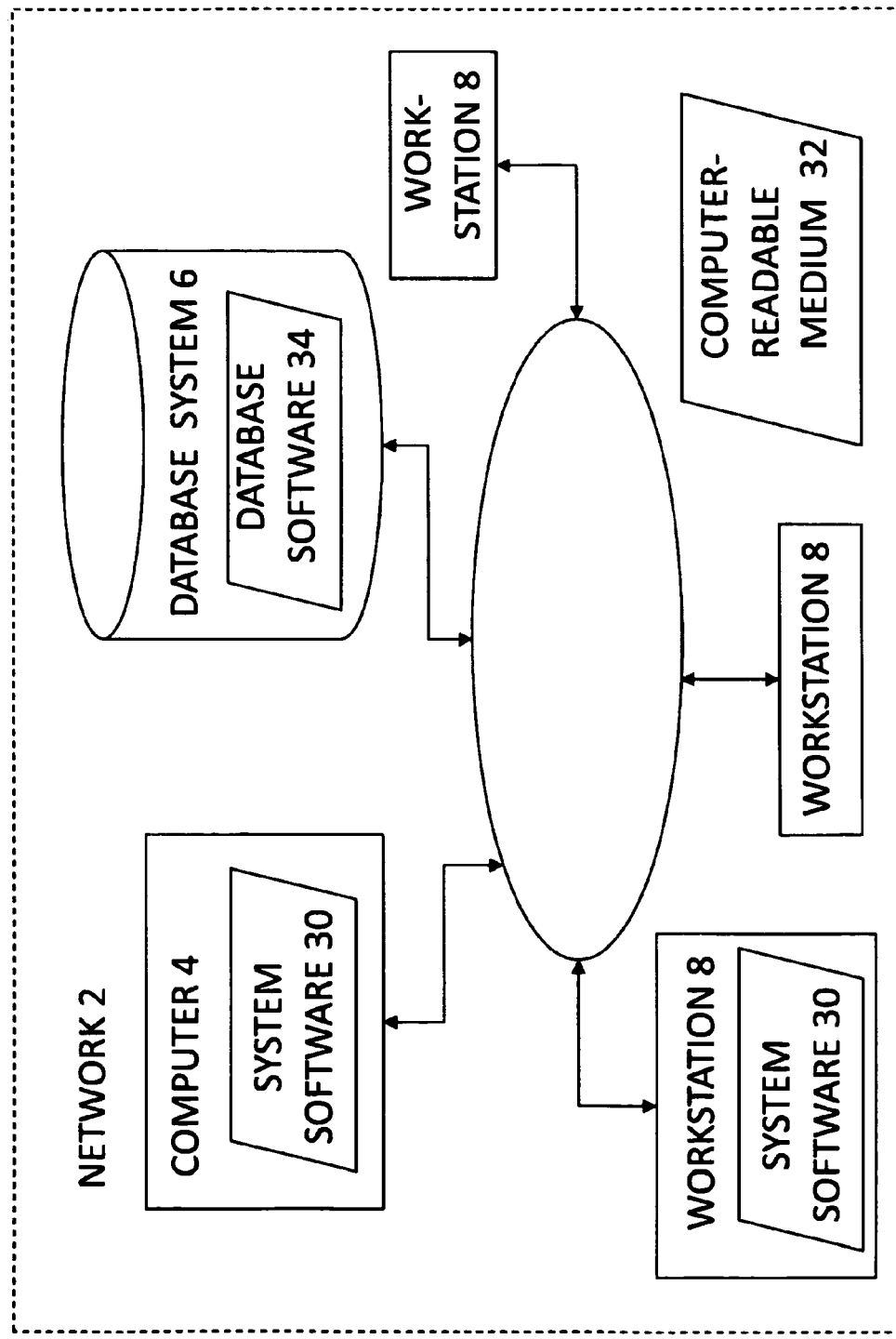
FIG. 1 is a schematic drawing of an electronics communications network that includes a computational system providing a software database function.

Referring now generally to the Figures, and particularly to FIG. 1, FIG. 1 is a schematic drawing of an electronics communications network 2 that includes a plurality of computational systems 4, 6, & 8 providing a software database function. The electronics communications network 2 (hereafter "network" 2) includes a networked computational system 4, a plurality of database systems 6 and computer workstations 8. The computational system 4 (hereafter "computer" 4), the database systems 6, and the computer workstations 8 (hereafter "workstations") may comprise, or be comprised within, (1.) a personal computer configured for running WINDOWS XP™ operating system marketed by Microsoft Corporation of Redmond, Wash., (2.) a computer workstation configured to run, and running, a LINUX or UNIX operating system, and/or (3.) other suitable computational system known in the art configured for software database management and accessibility. In particular, one or more of the computational systems 4, 6 & 8 may be a personal computer, such as (a.) an VAIO FS8900™ notebook computer marketed by Sony Corporation of America, of New York City, N.Y., (b.) an Apple Mac Book Pro™ personal computer, or (c.) other suitable computational system known in the art, and configured for wireless and/or landline connectivity with the Internet and/or the world wide web.

Figure 2:
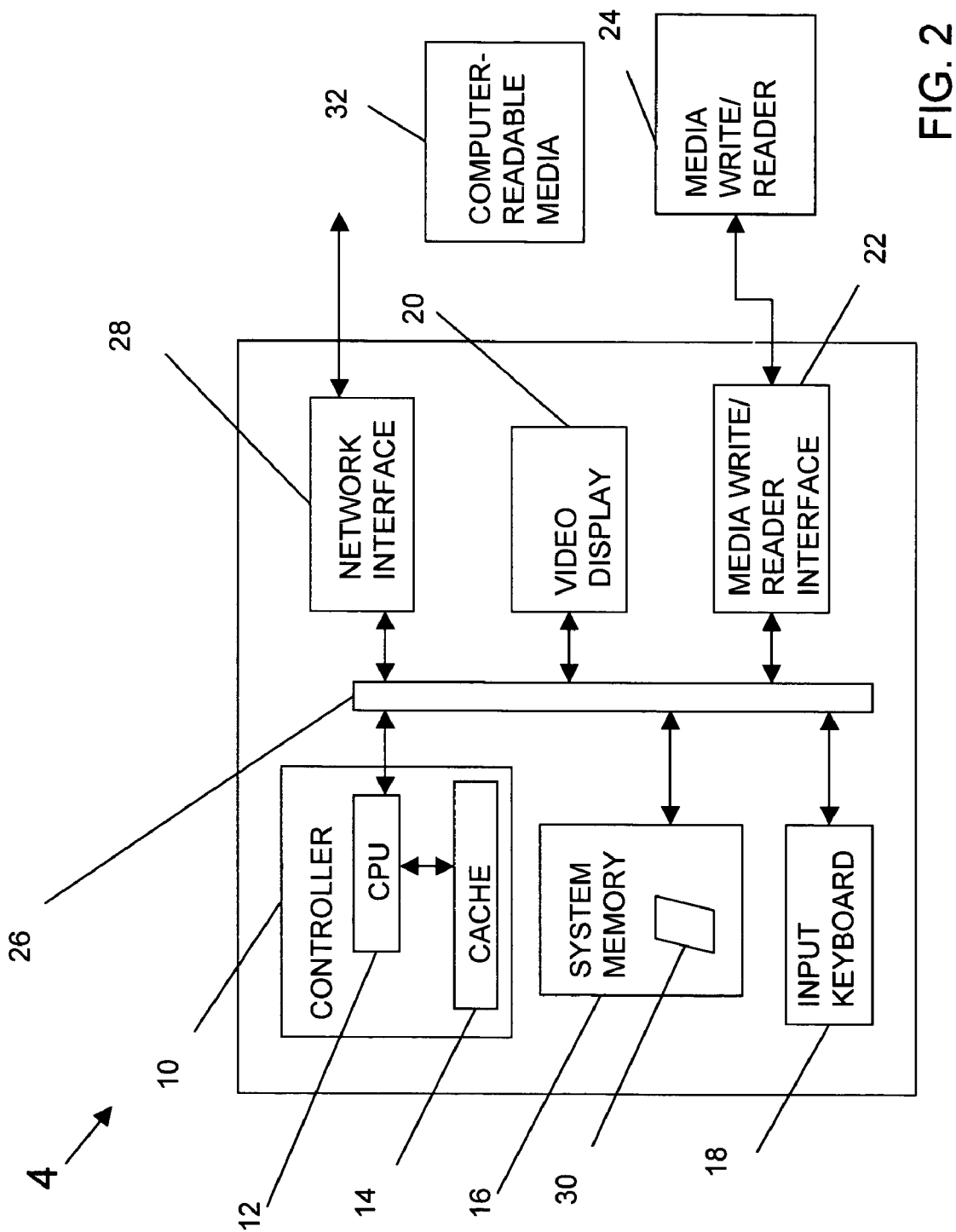
FIG. 2 is a detailed schematic of the computational system of FIG. 1.

Referring now generally to the Figures and particularly to FIG. 2, FIG. 2 is a detailed schematic of the computer 4 of FIG. 1. The computer 4 includes a controller 10 having a central processing unit 12 (hereafter "CPU") and an on-chip cache memory 14, a system memory 16, a data input device 18, a video display device 20, a media reader interface 22, a media reader 24, an internal communications bus 26, and a network communications bus 28. The CPU 12, the system memory 16, the data input device 18, the display device 20, the media reader interface 22, and the network interface 28 are communicatively coupled by means of the internal communications bus 26. The network communications bus 28 communicatively couples the computer 4 with the network 2 via the CPU 12 and the internal communications bus 26. The media reader interface 22 communicatively couples the media reader 24 with the CPU 12 and the system memory 16 by means of the internal communications bus 26. The system memory 16 stores a system software 30 of the computer 4.

The media reader 24 is configured to read computer-readable and machine executable instructions stored in a computer-readable medium 32 and transmit the read instructions to the CPU 12 and the system memory 16. The terms "computer-readable medium" and "computer-readable media" as used herein refer to any suitable medium known in the art that participates in providing instructions to the network 2 and/or the computer 4. Such a medium 32 may take many forms, including but not limited to, non-volatile media, volatile media, and transmission media. Non-volatile media includes, for example, optical or magnetic disks, such as may be comprised within the system memory.

Volatile media includes dynamic memory. Transmission media includes coaxial cables, copper wire and fiber optics. Transmission media can also take the form of acoustic or light waves, such as those generated during radio wave and infrared data communications.

Common forms of computer-readable media 32 include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer system can read.

Various forms of computer-readable media may be involved in carrying one or more sequences of one or more instructions to the network 2 for execution. For example, the instructions may initially be carried on a magnetic disk of a remote server workstation 8. The remote server workstation 8 can load the instructions into its dynamic memory and send the instructions over a telephone line using a modem. A modem local to or communicatively linked with the network can receive the data on the telephone line and use an infra-red transmitter to convert the data to an infra-red signal. An infrared detector can receive the data carried in the infrared signal and appropriate circuitry can provide the data to the network.

Figure 3:
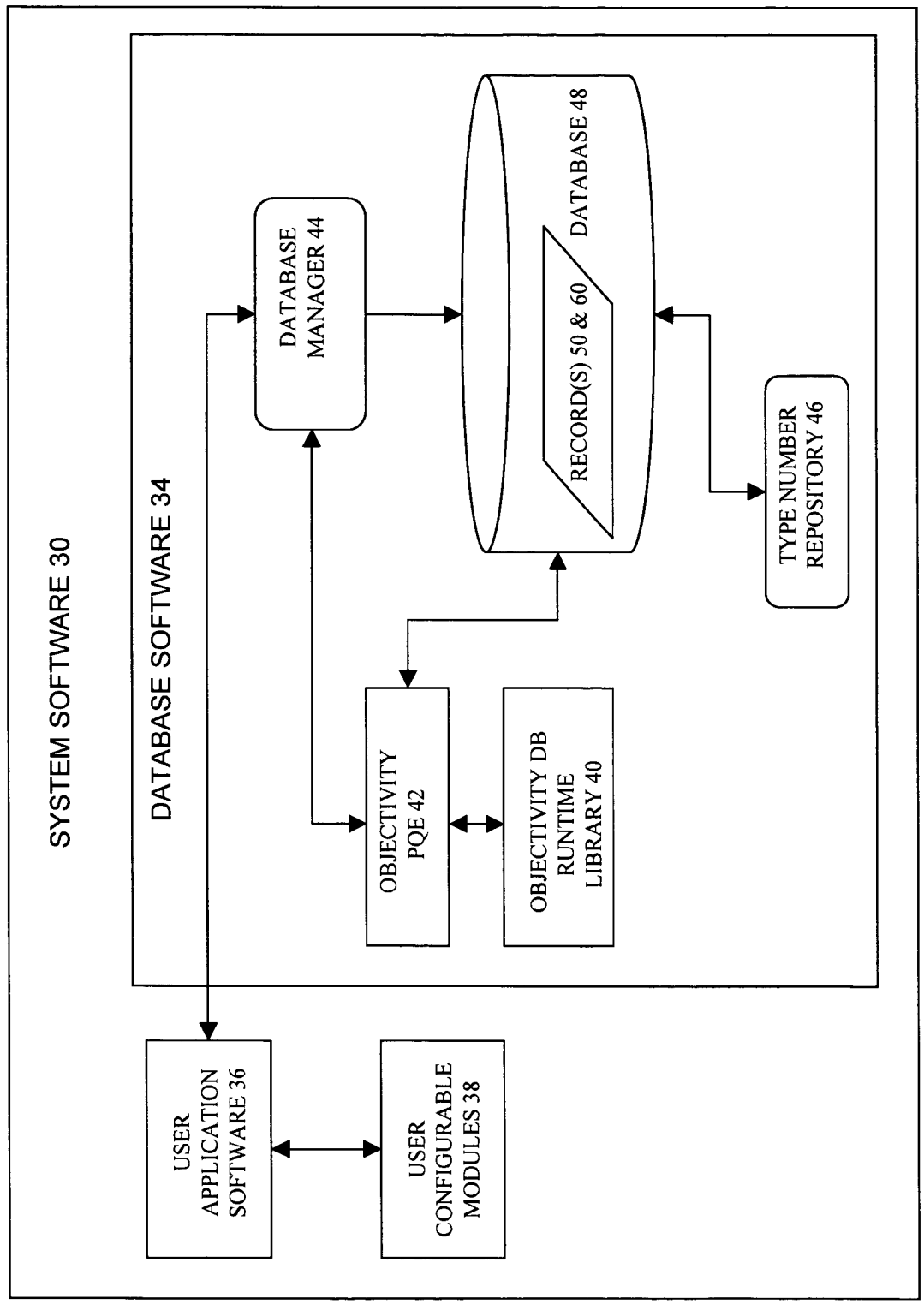
FIG. 3 is an entity diagram of a system software comprising a database software and maintained on or accessible to the computational system and/or the electronics communications network of FIG. 1.

Referring now generally to the Figures and particularly to FIG. 3, FIG. 3 is an entity diagram of a database software 34 of the system software 30 maintained on or accessible to the computer 4 and/or the network 2 of FIG. 1. The computer 4 or network 2 may host computer system software 30 that includes a (a.) user application software 36 (b.) one or more user configurable or user-defined components 38; (c.) an Objectivity/DB runtime library 40 as marketed by Objectivity, Inc. of Mt. View, Calif.; (d.) an Objectivity/DB Parallel Object Query Engine 42 as marketed by Objectivity, Inc. of Mt. View, Calif. A database manager 44 of the database software 34 accepts queries, instructions, commands and data from a computer 4 or the network 2, and thereupon accesses and modifies a type repository 46 and the software database 48 of the database software 34 compliance with the received queries, instructions, commands and data. The type number repository 46 includes descriptions of data structure designs that are applied when a data structure, e.g., a software object, is instantiated and populated by data contained in a data record 50 and/or information received from the computer and/or the network. Each record 50 of the plurality of records 50 is associated with an individual type number 52, and each type number 52 is associated with a schema 54 of a software object or other suitable data structure known in the art, whereby an instantiation of a record 50 is performed according to a schema identified by a type number 52 associated with the instant record 50. It is understood that multiple records 50 may be associated with a same type number 52 to enable the database manager 44 to instantiate and/or generate a plurality of records in accordance with an individual schema associated with a specific type number 52.

Figure 4:
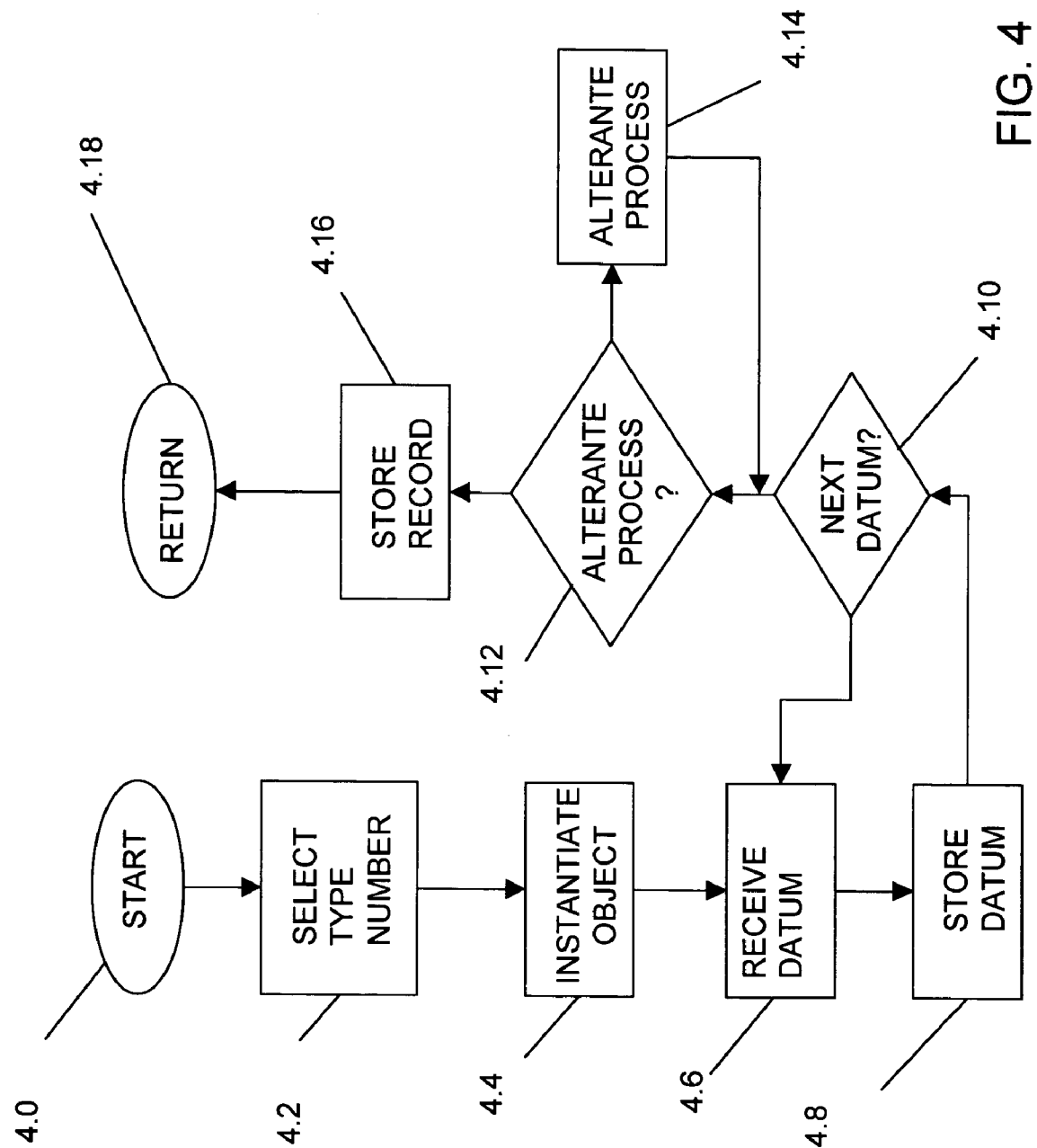
FIG. 4 is a flow chart of the creation of a software record of the database software of FIG. 3.

Referring now generally to the Figures and particularly to FIG. 4, FIG. 4 is a flow chart of the creation of a software record 50 of the database software of FIG. 3 by the computer 40. In step 4.2 a type number 52 is selected. In step 4.4 a data structure, e.g., a software object, designed in accordance with the instructions associated with the type number 52 selected in step 4.2 is instantiated. In step 4.6 a datum is received. In step 4.8 the last received datum is stored in the data structure instantiated in step 4.4. In step 4.10 the computer 4 determines whether to continue populating the instantiated data structure with more data by returning to step 4.6. In step 4.12 the computer 4 determines whether to next execute step 4.14 perform another process with the instantiated data structure. In step 4.16 the computer 4 stores the data of the instantiated data structure in a record 50. In step 4.18 the computer 4 returns to alternate processing.

Figure 5:
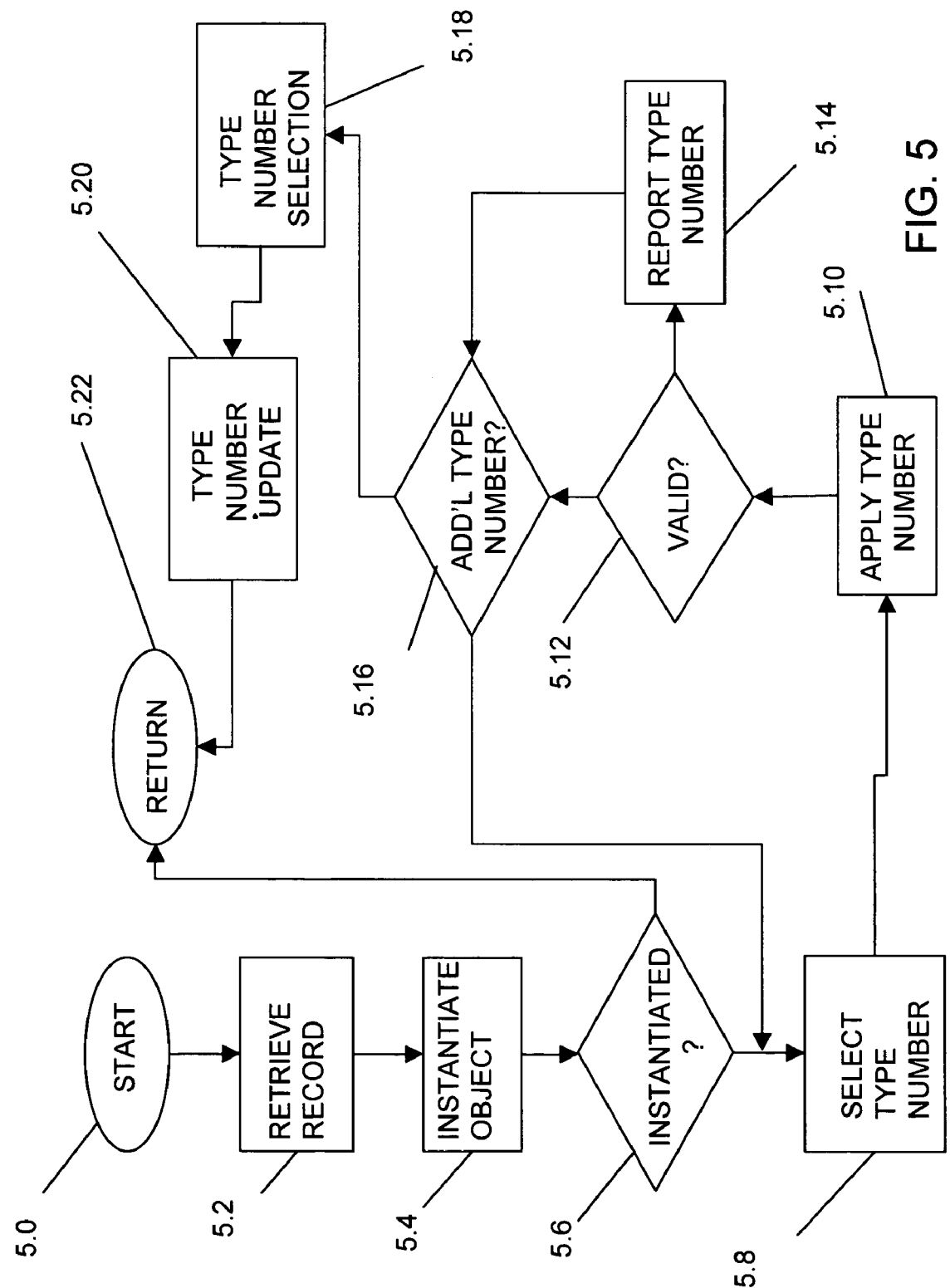
FIG. 5 is a flowchart of a first preferred embodiment of the method of the present invention that may be implemented by means of the computational system and/or the electronics communications network of FIG. 1 and the database software of FIG. 3.

Referring now generally to the Figures and particularly to FIG. 5, FIG. 5 is a flowchart of a first preferred embodiment of the method of the present invention that may be implemented by means of the computer 4 and/or the electronics communications network 2 of FIG. 1 and the database software of FIG. 3. In step 5.2 the computer 4 retrieves a record 50. In step 5.4 the computer 5 attempts to instantiate a software object in accordance with both a type number 52 stored in the record 50 and other information stored in the record 50. In step 5.6 the computer determines whether step 5.4 was successfully executed. In alternate step 5.8 the computer 4 initiates a process to identify one or more alternate data structures that might lead to a valid instantiation of the record 50 selected in step 5.2, wherein a type number 52 is selected and applied in step 5.10 to the instant record 50 of step 5.2 in an attempt to validly instantiate a data structure, e.g., software object, in accordance with an application of the type number 52 selected in step 5.8 and incorporating information contained in the instant record 50. In step 5.12 the computer 4 determines whether to report the type number 52 selected in step 5.8 to a system administrator as a possibly valid type number to be applied to the instant record 50 in light of the attributes of the instant record 50. A determination of validity of a type number 52 made in step 5.12 is then reported in step 5.14, wherein the type number 52 applied in step 5.10 is reported or indicated to the system administrator by means of the display device of the computer 4. In step 5.16 the computer 4 determines whether the system software 30 includes any remaining type numbers 52 that might be applied to the instant record 50, and proceeds on to step 5.8 to select a remaining type number 52 in an attempt to determine if the selected (and not previously applied) type number 52 might result in a valid instantiation of the instant record 50. In step 5.18 the computer 4 requests and receives a type number selection from the system administrator and in step 5.20 the computer 4 updates the instant record 50 by replacing the type number value with the type number 52 received in step 5.18. In step 5.22 the computer 4 proceeds on to other processes.

Figure 6:
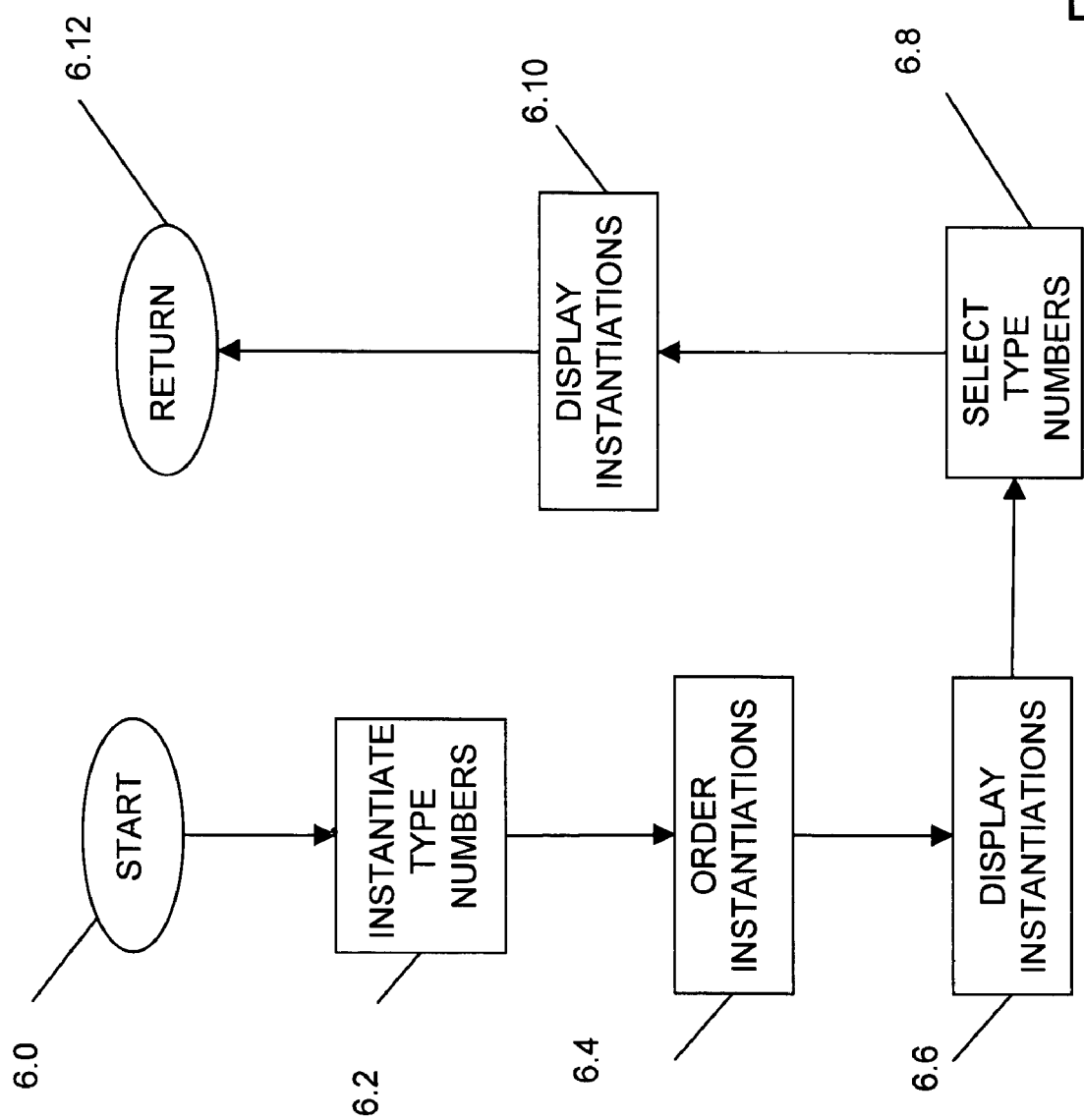
FIG. 6 is a flowchart of a second preferred alternate embodiment of the method of the present invention that may be implemented by means of the computational system and/or the electronics communications network of FIG. 1 and the database software of FIG. 3.

Referring now generally to the Figures and particularly to FIG. 6, FIG. 6 is a flowchart of a second preferred alternate embodiment of the method of the present invention that may be implemented by means of the computer 4 and/or the network 2 of FIG. 1 and the database software 34 of FIG. 3. In step 6.2 two or more schema associated with type numbers 52 are applied to the instant record 50 of step 5.8 to separately instantiate individual software objects. In step 6.4 the instantiations of step 6.4 are ordered in order of degree of compatibility of attributes with the instant record 50. In step 6.6 one or more of the instantiations of step 6.2 are provided to the system administrator by means of the display device 20. In alternate step 6.8 the system administrator selects type numbers 52 and directs the computer to individually instantiate one or more software objects in accordance with each selected type number 52. In alternate step 6.10 the object instantiations directed by the system administrator in step 6.8 are performed and provided to the system administrator via the display device 20.

The computer-readable media 32 may contain machine-executable software encoded instructions that direct and enable the computer and/or the network to perform one or more of the process steps of the method of the present invention discussed or disclosed herein.

Figure 7:
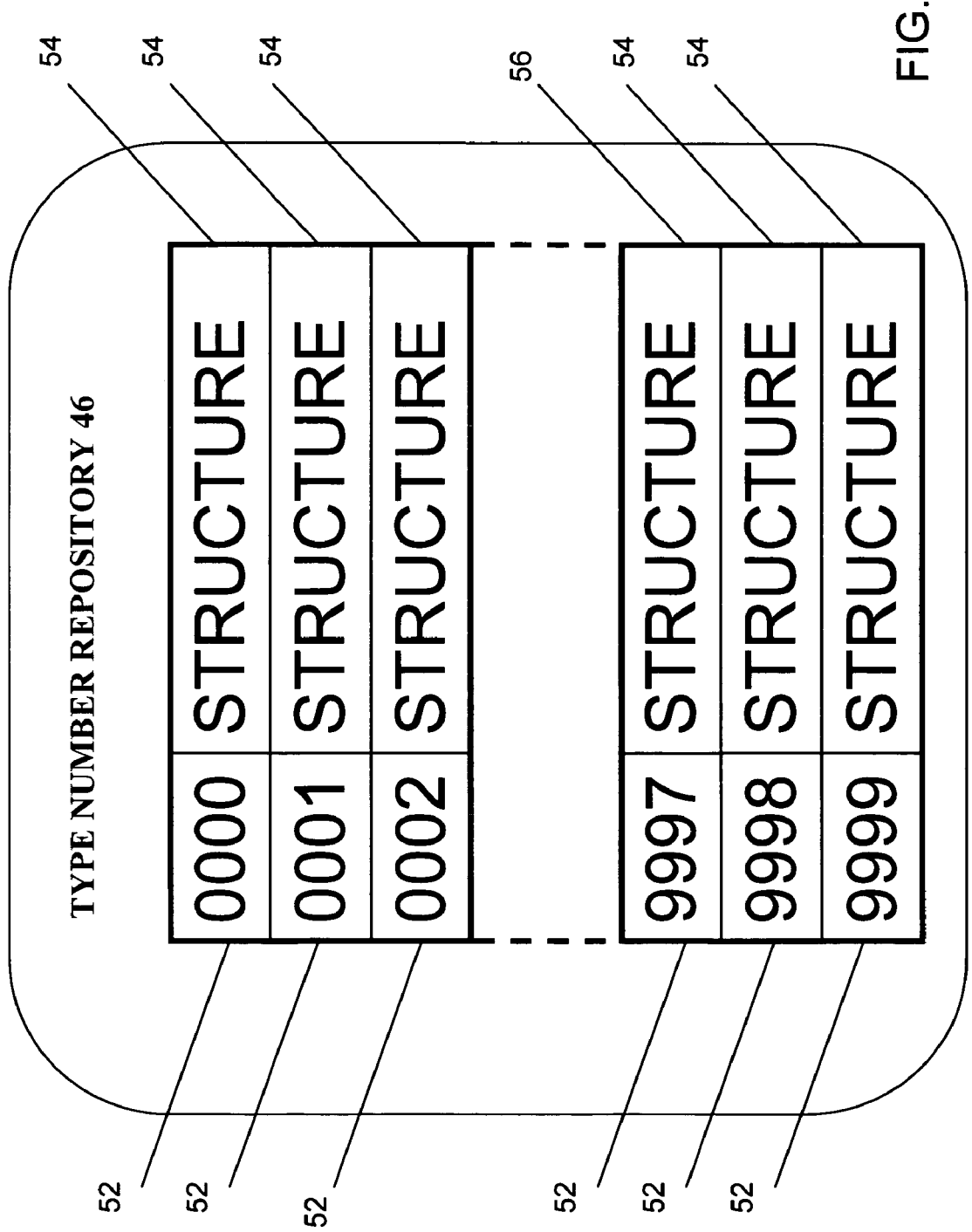
FIG. 7 is a schematic of a plurality of type numbers and associated schema as stored on a the type number repository of database software of FIG. 3.

Referring now generally to the Figures, and particularly to FIG. 7, FIG. 7 is a schematic of a plurality of type numbers 52 as associated individual schema 54 & 56 and stored within the type number repository 46 of database software 34 of FIG. 3. Each type number 52 identifies a unique schema 54 & 56. The type number 52 identifies to the database manager 44 which schema 54 or 56 to apply to an individual record 50. In other words, each record 50 may be associated with an individual type number 52 that used to by the database manager 44 to relate the instant record 50 with an individual and corresponding schema 54 or 56 associated with the instant type number 52. The database manager 44 may thereby instantiate a record 50 by generating and populating a software structure in accordance with a particular record 50 and in accordance with a selected schema 54 or 56.

Figure 8:
FIG. 8 is a schematic of the information contained in a populated software object structured in accordance with a software object structure associated with a type number 0087 of the type number repository of FIGS. 3 and 7.

Referring now generally to the Figures, and particularly to FIG. 8, FIG. 8 is a schematic of information contained in a populated software object 58 structured in accordance with a particular software object structure schema 56 associated with a type number 9997 of the type number repository 46 of FIGS. 3 and 7. In other words, information of the object 58 is sourced by the database manager 44 from a record 60 associated with a type number 9997. The schema 56 associated with the type number 9997 informs the database manager that the software object includes an ACCOUNT data field that stores information of the integer data type information; a NAME.FIRST data field that stores information as alphanumeric data type information; a NAME.LAST data field that stores information as alphanumeric data type information; a HEIGHT data field that stores information as real number type information; and a WEIGHT data field that stores information as real number type information.

Figure 9:
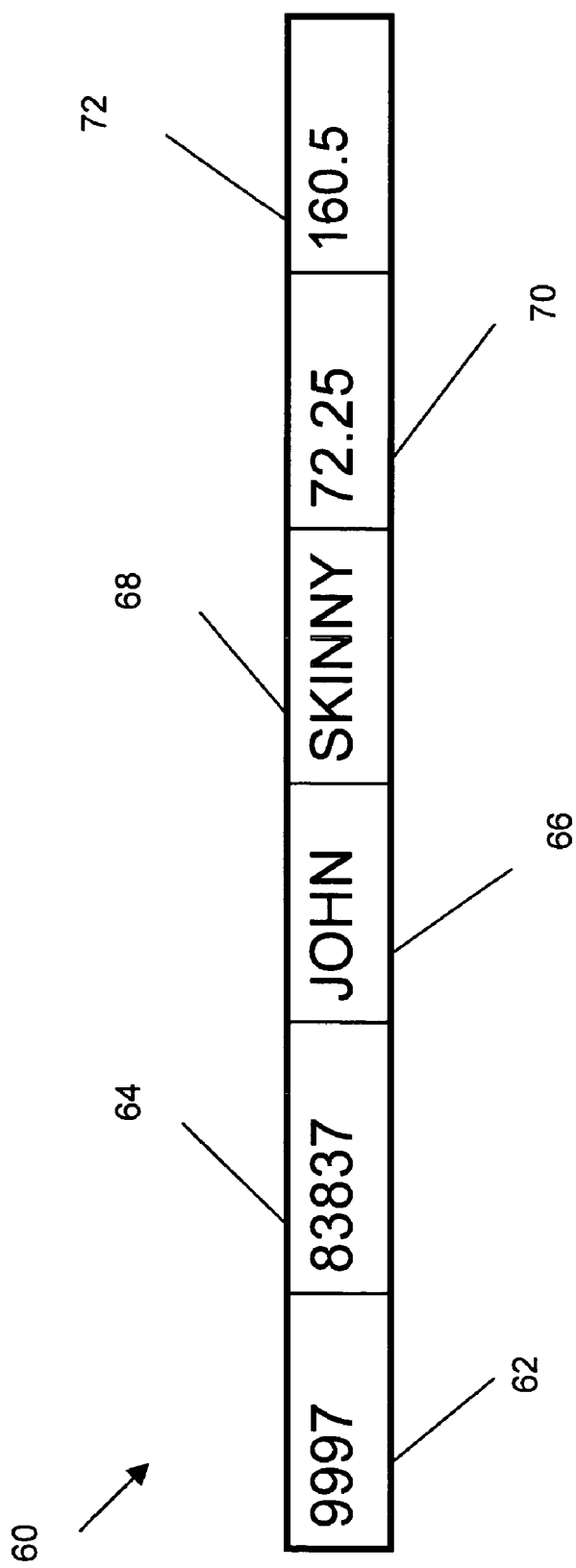
FIG. 9 is a schematic of a serialized representation of the information populating the software object of FIG. 8.

Referring now generally to the Figures, and particularly to FIG. 9, FIG. 9 is a schematic of a serialized representation of the information populating the software object 58 of FIG. 8 and as stored in a record 60 associated with the type number 9997. The record 60 is a particular record 50 of the plurality of records 50 stored in the database software 48. A first data field 62 stores a type number 52 value as an integer data type. A second data field 64 stores an account number value as an integer data type. A third data field 66 stores a first name of a person value as alphanumeric character information. A fourth data field 68 stores a last name of a person value as alphanumeric character information. A fifth data field 70 stores a height measurement value of a person as a real number. And a sixth data field 72 stores a body weight measurement value of a person as a real number.

The database manager 44 may thereby generate the software object 58 of FIG. 8 by applying the schema 56 to the information stored in the instant record 60 of FIG. 9. The database manager 44 associates the relevant schema 56 with the instant record 60 by means of reading the contents of the first data field 62 of the record 60 for the type number 52 to be referenced for selection of a schema 56 with which to generate the object 56.

When the type number 52 as stored in the first data field 62 of a record 50 or 60 has been corrupted or is otherwise invalid, the database manager 44 will not be correctly directed by the values, i.e., information, stored in the first data field to a valid schema 54 or 56. The values of a record 50 or 60 having an incorrect type number 52 association may thereby be unavailable to a user.

Figure 10:
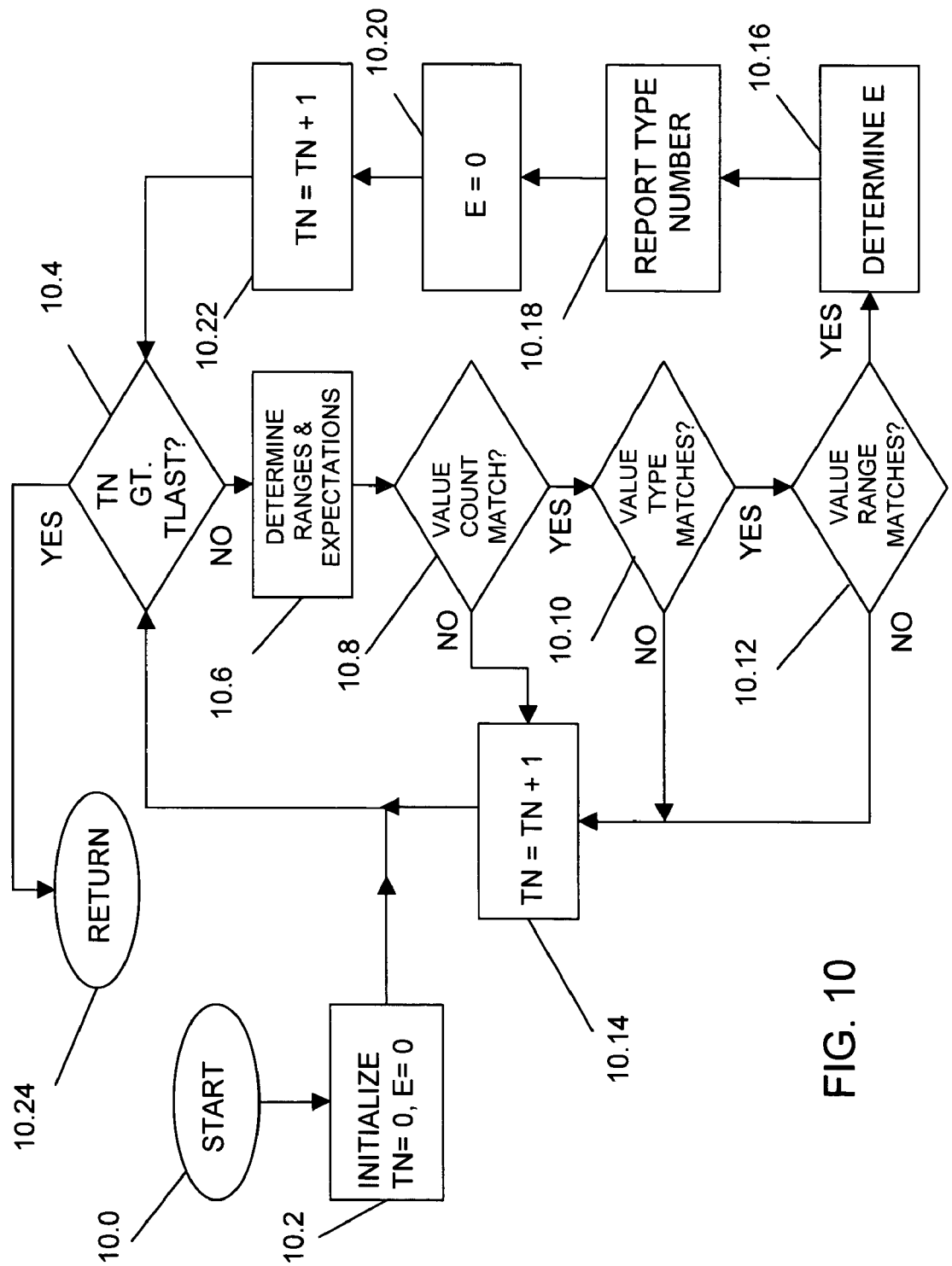
FIG. 10 is a flowchart directing the computational system and/or network of FIGS. 1 and 2 to determine type numbers that may be validly applied to the information of FIG. 9 in the generation of a valid software object.

Referring now generally to the Figures, and particularly to FIG. 10, FIG. 10 is a flowchart directing the computer 4 and/or network 2 of FIGS. 1 and 2 to determine type numbers 52 that may be validly applied to the information contained in records 50 & 60 of FIGS. 2, 3 and 9 by the database manager 44 in the generation of a valid software object 56. In step 10.2 the computer 4, or optionally the network 2, initialize a type number counter TN to a value of zero and expectation value counter E also to a value of zero. It is understood that the network 2 may at least partly enable, be enabled, tasked to perform, or perform one or more of the processes of the method of the present invention in whole or in part in certain various alternate preferred embodiments of the method of the present invention. The computer 4 proceeds from step 10.2 to execute step 10.4 to determine whether the TN type number counter value indicates if the last type number has been applied to the instant record 60. The TLAST value is equal to 9999 in the instant example.

In step 10.6 the computer 4 examines a type number 52 identified by the type number counter value TN to determine the count of values, the types of data, the permitted ranges of data values, and the expected ranges of data values of the schema associated with the type number 52 having the TN counter value. In step 10.8 the computer 4 determines if the number of values stored in the record 60 match the number of values enabled by the schema associated with type number 52 of the type number value TN. In step 10.10 the computer 4 determines if the types of values stored in the record 60 matches the types of values, e.g., integer data, real number data, and alphanumeric data, enabled by the schema associated with the type number 52 of the type number value TN. In step 10.12 the computer 4 determines if the types of values stored in the record 60 matches ranges of values, i.e., permitted magnitudes of values, enabled by the schema associated with the type number 52 of the type number value TN. The computer 4 proceeds from steps 10.8, 10.10 or 10.12 to step 10.14 to increment the type number value TN and to apply a schema 54 or 56 associated with the newly designated type number 52 in step 10.6 through 10.12.

In step 10.16 the computer 4 examines the values of the instant record 60 to determine how many, if any, if these values lie within expected ranges of values. For example, a human weight value WEIGHT might be permitted by a schema 54 to lay within 50 pounds and 300 pounds, but the expected range might be 90 pounds to 250 pounds. So a WEIGHT value of 299 pounds would pass the test of step 10.12, but be an unlikely valid weight datum. Where a value of the record 60 fits within an expected range, the E value is raised. Schemas 54 that may be applied to a record 50 or 60 that generate higher E count values are more likely to be a valid fit with a record, and the associated type number may be prioritized as more likely to be valid when presented to a user in step 10.18.

In step 10.20 the E counter value is returned to zero and in step 10.22 the TN count value is incremented. The computer 4 proceeds from step 10.22 to step 10.4 to again confirm that the counter value TN is not greater than the highest type number value 52. As noted above, the TLAST value is equal to 9999 in the instant example.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the Present Invention as disclosed and claimed should, therefore, be determined with reference to the knowledge of one skilled in the art and in light of the disclosures presented above.

I claim:

1. In an information technology system, a method for processing a detection of an invalid type number of a software object of an object oriented software database, the method comprising:
   a. Determining that an assigned schema identified by a type number associated with a software object is not applicable to the software object;
   b. Comparing the attributes of the software object with a plurality of alternate object schema, wherein each alternate object schema is assigned a unique type number;
   c. Determining which of the alternate object schema are applicable to the software object;

d. Informing a user of at least one type number of at least one schema that is applicable to the software object;
e. Receiving a user selection of a type number of at least one schema; and
f. Assigning the type number selected by the user, wherein the user directs the information technology system to assign a type number to the software object.

2. The method of claim 1, wherein all of the type numbers of each schema are applicable to the software object are identified to the user by the information technology system.

3. The method of claim 1, further comprising:
g. Analyzing the alternate object schema to determine a degree of compatibility of each of the schema with the software object;
h. Ordering the alternate object schema in order of degree of compatibility with the software object; and
i. Informing the user of the order of compatibility of the alternate object schema with the software object, wherein the user assigns a type number to the software object in light of the order of compatibility generated by the information technology system.

4. The method of claim 1, further comprising:
g. analyzing the alternate object schema to determine a degree of compatibility of each of the schema with the software object;
h. ordering the alternate object schema in order of degree of compatibility with the software object;
i. informing the user of the order of compatibility of the alternate object schema with the software object; and
j. Informing the user of at least two type numbers of alternate object schema, wherein the user assigns a type number identified by the information technology system to the software object.

5. The method of claim of claim 1, further comprising:
g. Analyzing the alternate object schema to determine a degree of compatibility of each of the schema with the software object;
h. Ordering the alternate object schema in order of degree of compatibility with the software object; and
i. Informing the user of a plurality of type numbers of the alternate object schema that are determined by the information technology system to be more compatible with the software object than at least one of the alternate object schema of the plurality of object schema, wherein the user assigns a type number to the software object selected from the plurality of type numbers determined by the information technology system to be more compatible than at least one of the alternate object schema of the plurality of object schema with the software object.

6. A computational system communicatively coupled with an information technology network, the information technology network including a software database comprising a plurality of software records, the computational system comprising:
a. means for determining that an assigned schema identified by a type number associated with a software record is not applicable to the software record;
b. means for comparing the attributes of the software record with a plurality of alternate record schema, wherein each alternate record schema is assigned a unique type number;
c. means for determining which of the alternate record schema are applicable to the software record;
d. means for informing a user of at least one type number of at least one record schema that is applicable to the software record;
e. means for receiving a user selection of a type number of at least one record schema; and
f. means for assigning the type number selected by the user, wherein the user directs the information technology system to assign the user selected type number to the software record.

7. The computational system of claim 6, wherein the system further comprises a means of enabling a user to associate a type number provided with the record.

8. The computational system of claim 6, wherein the system further comprises a means of enabling a user to assign a type number to the record as stored in the database.

9. The computational system of claim 6, wherein the system further comprises means of enabling a user to apply a schema of a type number to an instantiation of the record.

10. The computational system of claim 6, wherein the system further comprising a means of enabling a user to apply each schema of two or more type numbers provided in an instantiation of the record, whereby the user evaluates separate alternate instantiations of the record with each applied schema.

11. The computational system of claim 6, wherein the record is a software object.

12. A tangible computer-readable storage media comprising machine-readable instructions that direct a computational system to execute the steps of the method of claim 1.

* * * * *